United States Patent
Odake et al.

(10) Patent No.: US 9,113,160 B2
(45) Date of Patent: Aug. 18, 2015

(54) 3-DIMENSIONAL IMAGE DISPLAY DEVICE AND DISPLAY METHOD THEREOF

(71) Applicant: SAMSUNG DISPLAY CO., LTD., Yongin, Gyeonggi-Do (KR)

(72) Inventors: Ryota Odake, Hwaseong-si (KR); Se Joon Oh, Suwon-si (KR); Goro Hamagishi, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 301 days.

(21) Appl. No.: 13/675,794

(22) Filed: Nov. 13, 2012

(65) Prior Publication Data

US 2013/0307948 A1    Nov. 21, 2013

(30) Foreign Application Priority Data

May 16, 2012 (KR) .................. 10-2012-0052163

(51) Int. Cl.
*H04N 13/04* (2006.01)
*G02F 1/1335* (2006.01)

(52) U.S. Cl.
CPC ....... *H04N 13/0484* (2013.01); *H04N 13/0404* (2013.01); *H04N 13/047* (2013.01); *H04N 13/0418* (2013.01); *H04N 13/0475* (2013.01); *H04N 13/0477* (2013.01); *G02F 1/133526* (2013.01); *H04N 2013/0463* (2013.01); *H04N 2013/0465* (2013.01)

(58) Field of Classification Search
None
See application file for complete search history.

(56) References Cited

U.S. PATENT DOCUMENTS

| | | | |
|---|---|---|---|
| 2003/0020883 A1* | 1/2003 | Hara | 353/31 |
| 2010/0039573 A1 | 2/2010 | Park et al. | |
| 2010/0177186 A1* | 7/2010 | Baranton | 348/78 |
| 2010/0302351 A1 | 12/2010 | Yanamoto | |
| 2011/0006979 A1 | 1/2011 | Min et al. | |
| 2011/0234582 A1* | 9/2011 | Daiku et al. | 345/419 |
| 2011/0285761 A1* | 11/2011 | Yu | 345/691 |
| 2011/0310232 A1* | 12/2011 | Wilson et al. | 348/51 |
| 2012/0200495 A1* | 8/2012 | Johansson | 345/156 |

FOREIGN PATENT DOCUMENTS

| | | |
|---|---|---|
| JP | 05107663 A | 4/1993 |
| JP | 2005077437 A | 3/2005 |
| JP | 2008527429 A | 7/2008 |
| JP | 2010276817 A | 12/2010 |
| KR | 1020070023849 A | 3/2007 |
| KR | 1020090006473 A | 1/2009 |

(Continued)

*Primary Examiner* — William C Vaughn, Jr.
*Assistant Examiner* — Eileen Adams
(74) *Attorney, Agent, or Firm* — Cantor Colburn LLP

(57) ABSTRACT

A 3-dimensional image display device includes: a backlight unit; a barrier panel above the backlight unit and including unit barriers which selectively blocks light; a lenticular lens array above the barrier panel and including lenticular lenses, each having a principal point; a liquid crystal panel above the lenticular lens array; an eye tracking sensor which detects a position of eyes of a viewer and a distance between the principal point of the lenticular lenses and the eyes; and a controller which controls the backlight unit, the barrier panel and the liquid crystal panel based on an output of the eye tracking sensor, where the controller turns on and off the unit barriers such that light passes through the principal point of the lenticular lenses to apply a right-eye image to a right eye of the viewer and apply a left-eye image to a left eye of the viewer.

20 Claims, 10 Drawing Sheets

(56) References Cited

FOREIGN PATENT DOCUMENTS

| KR | 100910922 B1 | 7/2009 |
| KR | 1020100009739 A | 1/2010 |
| KR | 1020110078793 A | 7/2011 |
| WO | 2006072234 A2 | 7/2006 |

* cited by examiner

3-DIMENSIONAL IMAGE DISPLAY DEVICE AND DISPLAY METHOD THEREOF

This application claims priority to Korean Patent Application No. 10-2012-0052163, filed on May 16, 2012, and all the benefits accruing therefrom under 35 U.S.C. §119, the content of which in its entirety is incorporated herein by reference.

BACKGROUND (a) Field

Exemplary embodiments of the invention relate to a 3-dimensional image display device and a display method of the 3-dimensional image display device, and more particularly, to an autostereoscopic 3-dimensional image display device and a display method of the autostereoscopic 3-dimensional image display.

(b) Description of the Related Art

High-speed information transmission/reception services based on high-speed information and communication networks are recently developed from services, such as current phones, for simply listening and speaking to multimedia services which allows viewers to watch and listen to mainly using digital terminals for processing texts, voices and images at a high speed, and ultimately to hyper-space type realistic 3-dimensional information and communication services which may allow viewers to watch, feel and enjoy realistically with 3-dimensionally, without limitation in time and space.

In general, a 3-dimensional image for expressing 3-dimension is realized based on principle of stereovision through two eyes of a viewer, and a disparity of two eyes, that is, a binocular disparity due to the distance of the two eyes, which is about 65 centimeters (cm), may be one of the most important factors that allows the viewer to recognize a 3-dimensional feeling. That is, the left and right eyes see different 2-dimensional images, and if the two different 2-dimensional images are transferred to a brain via retinas, the brain combines the images to reproduce the depth of the 3-dimensional image, which is generally referred to as stereography.

3-dimensional image display devices using binocular disparities are typically classified into a stereoscopic type such as a polarization type or a time division type, and an autostereoscopic type such as a parallax-barrier type, a lenticular type, or a blinking light type according to whether an observer wears a separate pair of glasses.

The autostereoscopic type 3-dimensional image display device typically employs an apparatus for separating a left-eye image and a right-eye image such as a lenticular lens layer on a liquid crystal display unit. The autostereoscopic type 3-dimensional display device may allow an observer to recognize a 3-dimensional image without using a pair of glasses. In a conventional autostereoscopic type 3-dimensional image display device, a viewer in a predetermined position relative to a screen may recognize a 3-dimensional image without defect, but when the viewer is not in the predetermined position, cross-talks may occur, that is, a left-eye image may be seen by the right eye of the viewer, which may prevent the viewer from recognizing a normal 3-dimensional image.

In such a conventional autostereoscopic type 3-dimensional image display device, a normal 3-dimensional image may not be normally displayed due to a lens aberration, a pitch error, a gap error and the like which may occur during a manufacturing process.

SUMMARY

Exemplary embodiments of the invention relate to a 3-dimensional image display device which allows a viewer to recognize a 3-dimensional image irrespective of a location of the viewer, and a display method of the 3-dimensional image display device.

An exemplary embodiment of the invention provides a 3-dimensional image display device including: a backlight unit; a barrier panel disposed above the backlight unit and including a plurality of unit barriers which selectively blocks light passing therethrough; a lenticular lens array disposed above the barrier panel and including a plurality of lenticular lenses, each having a principal point; a liquid crystal panel disposed above the lenticular lens array and configured to display an image; an eye tracking sensor which detects a position of eyes of a viewer and a distance between the principal point of the lenticular lenses and the eyes of the viewer; and a controller which controls the backlight unit, the barrier panel and the liquid crystal panel based on an output of the eye tracking sensor, where the controller turns on and off the unit barriers such that light passes through the principal point of the lenticular lenses to apply a right-eye image to a right eye of the viewer and apply a left-eye image to a left eye of the viewer.

In an exemplary embodiment, a center of the two eyes of the viewer may be detected by the eye tracking sensor, and the unit barriers may be divided into a right-eye barrier and a left-eye barrier with respect to a unit barrier on the barrier panel which meets an imaginary line extending from the center of the two eyes to the principal point of the lenticular lenses.

In an exemplary embodiment, a center of the two eyes of the viewer may be detected by the eye tracking sensor, and the unit barriers may be divided into a right-eye barrier and a left-eye barrier with respect to a border of a unit barrier on the barrier panel, where the unit barrier meets an imaginary line extending from the center of the two eyes through the principal point of the lenticular lenses, and a point at which the unit barrier and the imaginary line meet is closer to the border of the unit barrier than an opposing border of the unit barrier.

In an exemplary embodiment, the unit barriers may include a unit barrier which is disposed between the right-eye barrier and the left-eye barrier and constantly turned off.

In an exemplary embodiment, a projection image pitch formed at the position of the eyes of the viewer may be less than a distance between the eyes of the viewer.

In an exemplary embodiment, when a barrier pitch is denoted as $P_B$, a pitch of the lenticular lens is denoted as $P_L$, a minimum value of the distance between the two eyes of the viewer is denoted as $P_{Emin}$, a distance between the principal point of the lenticular lenses and the eyes of the viewer is denoted as Dx, and a distance between the barrier panel and the lenticular lenses is denoted as d, the following equation and inequation may be satisfied:

$$P_B = P_L^*(D+d)/D/m; \text{ and}$$

$$P_B < P_{Emin}^* d/Dx,$$

where m is a positive fraction.

In an exemplary embodiment, the liquid crystal panel may include an upper polarizer, and the barrier panel includes an upper polarizer and a lower polarizer.

In an exemplary embodiment, when the number of viewers is greater than two and a first viewer and a second viewer of the viewers are adjacent to each other such that the right eye of the first viewer and the left eye of the second viewer is adjacent to each other, a center of the right eye of the first viewer and the left eye of the second viewer may be detected by the eye tracking sensor, the unit barriers may be divided into a right-eye barrier and a left-eye barrier of each of the first and second viewers, the right-eye barrier of the first viewer and the left-eye barrier of a second viewer may be divided with respect to a unit barrier positioned at a point where an imaginary line extending from the center of the right eye of the first viewer and the left eye of the second viewer through the principal point of the lenticular lenses meet the barrier panel.

In an exemplary embodiment, only one of the right-eye image and the left-eye image may be provided to a viewer of the plurality of viewers such that the viewer receives a 2-dimensional image.

Another exemplary embodiment of the invention provides a display method of a 3-dimensional image display device including a liquid crystal panel, a barrier panel, a lenticular lens array, a backlight unit, an eye tracking sensor and a controller, the method including: detecting a position of a left eye and right eye of a viewer and a distance between the left and right eyes of the viewer using the eye tracking sensor; operating unit barriers of the barrier panel as a right-eye barrier and a left-eye barrier by the controller based on an output of the eye tracking sensor; turning on the right-eye barrier when the a right-eye image is displayed by the liquid crystal panel such that the right-eye image is applied to the right eye of the viewer by light passing through principal points of lenticular lenses in the lenticular lens array; and turning on the left-eye barrier when the a left-eye image is displayed by the liquid crystal panel to apply the left-eye image to a left eye of the viewer by light passing through the principal points of the lenticular lenses in the lenticular lens array.

In an exemplary embodiment, the operating the unit barriers of the barrier panel as the right-eye barrier and the left-eye barrier may include dividing the unit barriers into the right-eye barrier and the left-eye barrier with respect to a unit barrier of the barrier panel which meets an imaginary line extending from the center of the left and right eyes through a principal point of a lenticular lens in the lenticular lens array.

In an exemplary embodiment, the operating the unit barriers of the barrier panel as the right-eye barrier and the left-eye barrier may include dividing the unit barriers into the right-eye barrier and the left-eye barrier with respect to a border of a unit barrier on the barrier panel, where the unit barrier meets an imaginary line extending from the center of the two eyes through the principal point of the lenticular lenses, and where a point at which the unit barrier and the imaginary line meet is closer to the border of the unit barrier than an opposing border of the unit barrier.

In an exemplary embodiment, the method may further include constantly turning on a unit barrier disposed between the right-eye barrier and the left-eye barrier.

In an exemplary embodiment, a projection image pitch formed at the position of the eyes of the viewer may be less than a distance between the eyes of the viewer.

In an exemplary embodiment, when a barrier pitch is denoted as $P_B$, a pitch of the lenticular lenses is denoted as $P_L$, a minimum value of the distance between the two eyes of the viewer is denoted as $P_{Emin}$, a distance between the principal point of the lenticular lenses and the eyes of the viewer is denoted as Dx, and a distance between the barrier panel and the lenticular lenses is denoted as d, the following equation and inequation may be satisfied:

$$P_B = P_L * (D+d)/D/m; \text{ and}$$

$$P_B < P_{Emin} * d/Dx,$$

where m is a positive fraction.

In an exemplary embodiment, when the number of viewers is greater than two and a first viewer and a second viewer of the viewers are adjacent to each other such that the right eye of the first viewer and the left eye of the second viewer is adjacent to each other, a center of the right eye of the first viewer and the left eye of the second viewer may be detected by the eye tracking sensor, the unit barriers may be divided into a right-eye barrier and a left-eye barrier of each of the first and second viewers.

In an exemplary embodiment, the right-eye barrier of the first viewer and the left-eye barrier of a second viewer may be divided with respect to a unit barrier positioned at a point where an imaginary line extending from the center of the right eye of the first viewer and the left eye of the second viewer through the principal point of the lenticular lenses meet the barrier panel.

In an exemplary embodiment, only one of the right-eye image and the left-eye image may be provided to a viewer of the plurality of viewers such that the viewer receives a 2-dimensional image.

In one or more exemplary embodiments, the 3-dimensional image display device and the display method thereof which operates based on a predetermined condition as described above provide an image with substantially improved quality to a viewer when the viewer is positioned at a distance greater than or less than an optimum distance or when the number of viewers is greater than or equal to two.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION OF THE EMBODIMENTS

Figure 1:
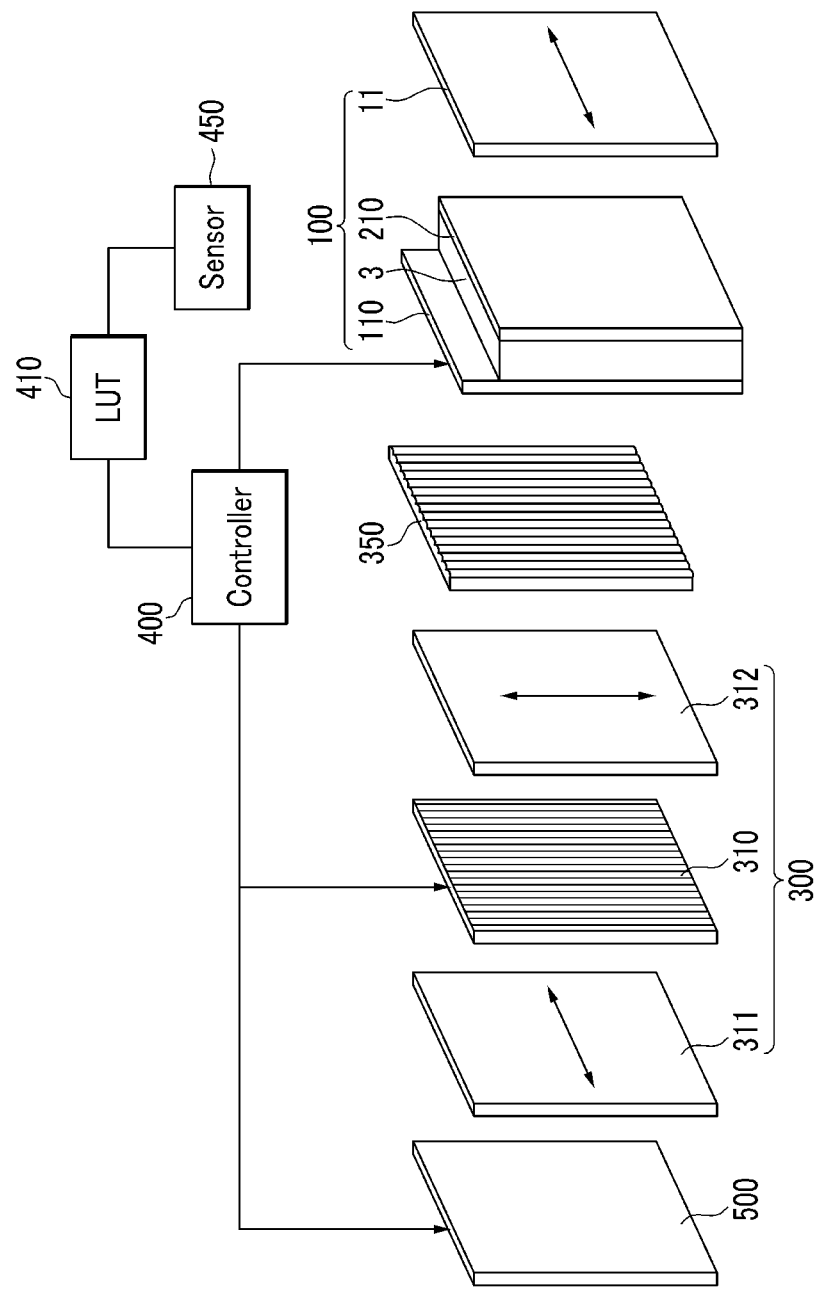
FIG. 1 is a block diagram showing an exemplary embodiment of a 3-dimensional image display device according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a 3-dimensional image display device according to an exemplary embodiment of the invention will be described in detail with reference to FIG. 1.

FIG. 1 is a block diagram showing an exemplary embodiment of a 3-dimensional image display device according to the invention.

An exemplary embodiment of the 3-dimensional image display device according to the invention includes a liquid crystal panel 100, a lenticular lens array 350, a barrier panel 300, a backlight unit 500, an eye tracking sensor 450, a lookup table ("LUT") 410 and a controller 400.

In an exemplary embodiment, the liquid crystal panel 100 is disposed in an uppermost portion of the 3-dimensional image display device, and includes a lower display panel 110, an upper display panel 210, a liquid crystal layer 3 and an upper polarizer 11. In an exemplary embodiment, gate lines, data lines and thin film transistors connected to the gate lines and the data lines are disposed on the lower display panel 110 of the liquid crystal panel 100, and output terminals of the thin film transistors are connected to pixel electrodes. A common electrode for generating electric fields together with the pixel electrodes is provided in the upper display panel 210, and a light shielding member including a color filter and an opening formed at a portion of the color filter is provided in the upper display panel 210. The liquid crystal layer 3 includes liquid crystal molecules, and when an electric field is not generated in the liquid crystal layer 3, the liquid crystal molecules may be oriented vertically or oriented horizontally. The liquid crystal molecules in the liquid crystal layer 3 may include various types of the liquid crystal molecules.

In an exemplary embodiment, the liquid crystal panel 100 includes the upper polarizer 11 and may not include a lower polarizer. In such an embodiment, the liquid crystal panel 100 does not include a lower polarizer as light provided from the barrier panel 300 to the upper side is provided with a polarization direction thereof being determined to be one direction in advance in the 3-dimensional image display device, as illustrated in FIG. 1. However, in some exemplary embodiments, the liquid crystal panel 100 may include a lower polarizer having the same polarization direction as a polarization direction of the upper polarizer 312 of the barrier panel 300.

In such an embodiment, the liquid crystal panel 100 alternately displays left-eye images and right-eye images, and the liquid crystal panel 100 is driven at a frequency twice as high as a display frequency of a 3-dimensional image. When a 3-dimensional image of 60 hertz (Hz) is displayed, the liquid crystal panel 100 alternately displays a left-eye image and a right-eye image at a frequency of 120 Hz.

The backlight unit 500 is disposed at a lowermost portion of the 3-dimensional image display device. In an exemplary embodiment, the backlight unit 500 may include a light source (not shown), a light guide (not shown), a reflector (not shown) and an optical film (not shown), while FIG. 1 schematically shows the backlight unit 500 for convenience of illustration. In an exemplary embodiment, a light source may be disposed on a side surface of the backlight unit 500, but not being limited thereto. In an alternative exemplary embodiment, the light source may be disposed on a lower surface of the backlight unit 500. A plurality of optical films may be provided on the upper surface of the backlight unit, and various films for making luminance substantially uniform, collecting light or reinforcing luminance through an optical recycle may be provided.

In an exemplary embodiment of the 3-dimensional image display device according to the invention, the barrier panel 300 and the lenticular lens array 350 are disposed between the backlight unit 500 and the liquid crystal panel 100.

First, the barrier panel 300 will be described.

In an exemplary embodiment, the barrier panel 300 selectively blocks light passing therethrough. In such an embodiment, the barrier panel 300 may have various structures. Hereinafter, an exemplary embodiment where the barrier panel is a liquid crystal barrier panel including a liquid crystal layer will be described for convenience of description. The liquid crystal barrier panel 300 includes the upper polarizer 312, the lower polarizer 311 and a liquid crystal barrier array 310 including a lower substrate, an upper substrate and a liquid crystal layer disposed between the lower and upper substrates. In an exemplary embodiment, the plurality of barriers of the barrier panel 300 is arranged adjacent to each other to have a stripe pattern formed long a first direction. In an alternative exemplary embodiment, the barriers may be arranged substantially in the form of a matrix. In an exemplary embodiment of the liquid crystal barrier panel 300, a first electrode is disposed in the lower substrate and a second electrode is disposed in the upper substrate. A constant voltage may be applied to one of the first electrode and the second electrode, and a predetermined voltage may be applied to the other one of the first electrode and the second electrode to turn on or off the barriers. The barrier panel 300 may include a switching element such as a thin film transistor to control the barriers.

The arrangement direction of the liquid crystal layer of the liquid barrier panel is changed by an electric field generated between the first electrode and the second electrode, and when an electric field is not generated, the liquid crystal layer is initially oriented in a predetermined direction.

The light provided by the backlight unit 500 has a predetermined polarization direction while transmitting the lower polarizer 311, and when the polarization direction of the light is maintained while the light passes through the liquid crystal layer, the barrier is closed (turned off) such that the light transmitted to the upper polarizer 312 is blocked, and when the polarization direction of the light is rotated by about 90 degrees while the light passes through the liquid crystal layer, the barrier is opened (turned on) such that the light transmits through the upper polarizer 312.

The lenticular lens array 350 is disposed above the barrier panel 300 and below the liquid crystal panel 100. A plurality of semicircular lenticular lenses formed long in a first direction to be adjacent is disposed in the lenticular lens array 350. The lenticular lenses may be attached in the form of a film or may be provided on a substrate in the lenticular lens array 350.

In an exemplary embodiment, the first direction, in which the plurality of barriers of the barrier panel 300 and the lenticular lenses extend, may be substantially the same as the direction in which the pixels of the liquid crystal panel 100 or the barriers of the barrier panel 300 are arranged vertically. In an alternative exemplary embodiment, the first direction may form a predetermined angle with respect to the vertical direction. In another alternative exemplary embodiment, the plurality of barriers of the barrier panel 300 and the lenticular lenses may not be parallel to each other and may extend forming a slight angle with respect to each other.

In an exemplary embodiment, the plurality of unit barriers is arranged in the form of a matrix in the barrier panel 300, and the plurality of barriers arranged in the first direction may be operated together.

In an exemplary embodiment, as shown in FIG. 1, the barriers are arranged long the first direction in the barrier panel 300 such that the number of the constituent elements such as a thin film transistor is substantially reduced, thereby improving an aperture ratio and simplifying control signals.

A relationship between a pitch of the pixels of the liquid crystal panel 100, a pitch $P_B$ of the barriers of the barrier panel 300, and a pitch $P_L$ of the lenticular lenses is not specified in the exemplary embodiments of the invention. In an exemplary embodiment, a predetermined condition is satisfied regardless of the pitches, which will be described later in greater detail, and a 3-dimensional image is thereby effectively displayed. In such an embodiment, at least two barriers of the barrier panel 300 are disposed in one pitch $P_L$ of the lenticular lenses for light to be deflected to left and right eyes before the light progresses further. The pitch $P_L$ of the lenticular lenses may be about odd number times as large as the pitch $P_B$ of the barriers or may be a positive fraction of the pitch $P_B$ of the barriers.

As the barrier pitch of the barrier panel 300 becomes smaller, a 3-dimensional image may be controlled more precisely, and as the pitch of the pixels becomes smaller, an image having a higher resolution may be obtained.

An exemplary embodiment of the 3-dimensional image display device according to the invention includes the eye tracking sensor 450. In an exemplary embodiment, the eye tracking sensor 450 detects positions of the eyes of the viewer, e.g., relative positions of the eyes of the viewer with respect to the 3-dimensional image display device, and a distance between the 3-dimensional image display device and the eyes of the viewer. In an alternative exemplary embodiment, the eye tracking sensor 450 may detect positions of the centers of the pupils of the viewer and thereby detect a distance between the 3-dimensional image display device and the eyes. In such an embodiment, the eye tracking sensor 450 may also detect a distance between the two eyes of the viewer or a distance between the centers of the pupils.

In an exemplary embodiment, data generated based on the detected positions of the eye tracking sensor 450 are transferred to the LUT 410, and operation timing data corresponding thereto and stored in advance are selected based on the detection data. In such an embodiment, the selected operation timing data are transferred to the controller 400, and the controller 400 thereby controls the backlight unit 500, the barrier panel 300 and the liquid crystal panel 100 such that a left-eye image and a right-eye image are provided to the two eyes of the viewer according to the operation timing data based on the detected positions data of the eye tracking sensor 450. In an exemplary embodiment, as shown in FIG. 1, a single controller 400 controls all the constituent elements, but not being limited thereto. In an alternative exemplary embodiment, a plurality of controllers for controlling the liquid crystal panel 100 and the barrier panel 300, respectively, may be provided, considering the data processing capacity and processing speed of the controller. In an exemplary embodiment, a controller for separately processing an output of the eye tracking sensor 450 may be further provided. In an exemplary embodiment, the LUT 410 may be disposed in the controller 400 or may be provided in the eye tracking sensor 450 or the controller thereof. In an exemplary embodiment, where a plurality of controllers is provided, one of the controllers may control the other controllers.

An exemplary embodiment of a method of displaying a 3-dimensional image using the 3-dimensional image display device according to the invention will now be described.

In an exemplary embodiment, the eye tracking sensor 450 detects positions of the eyes of the viewer and a distance between the 3-dimensional display device and the viewer, and outputs the locations and distance to the controller 400. The controller 400 turns on and off the barriers of the barrier panel 300 such that a 3-dimensional image may be displayed to the viewer based on the operation timing data of the LUT 410 based on the position data detected by the eye tracking sensor 450.

Figure 7:
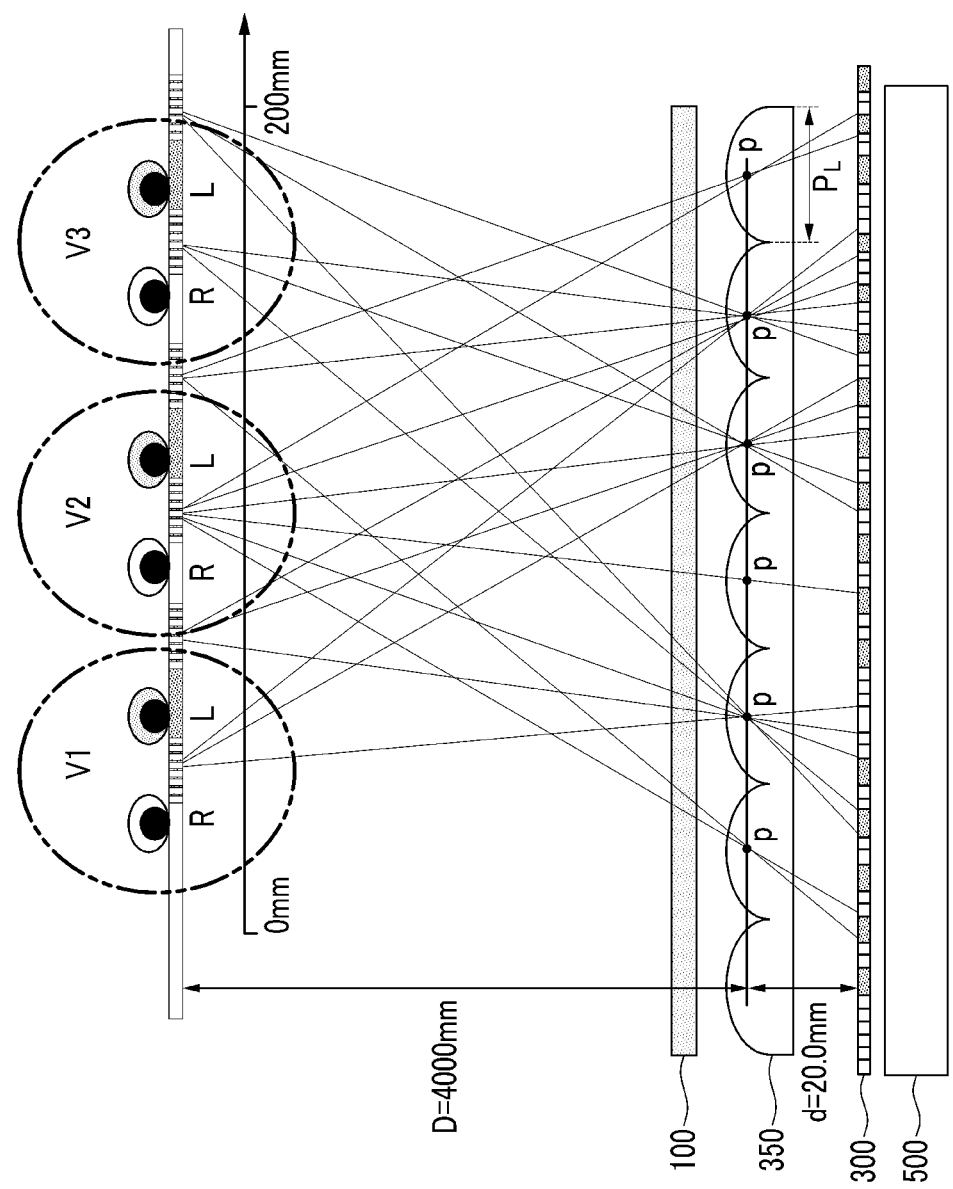
FIGS. 7 to 9 are schematic views illustrating an exemplary embodiment of a method of providing a 3-dimensional image to a plurality of viewers using the 3-dimensional image display device according to the invention.
Figure 8:
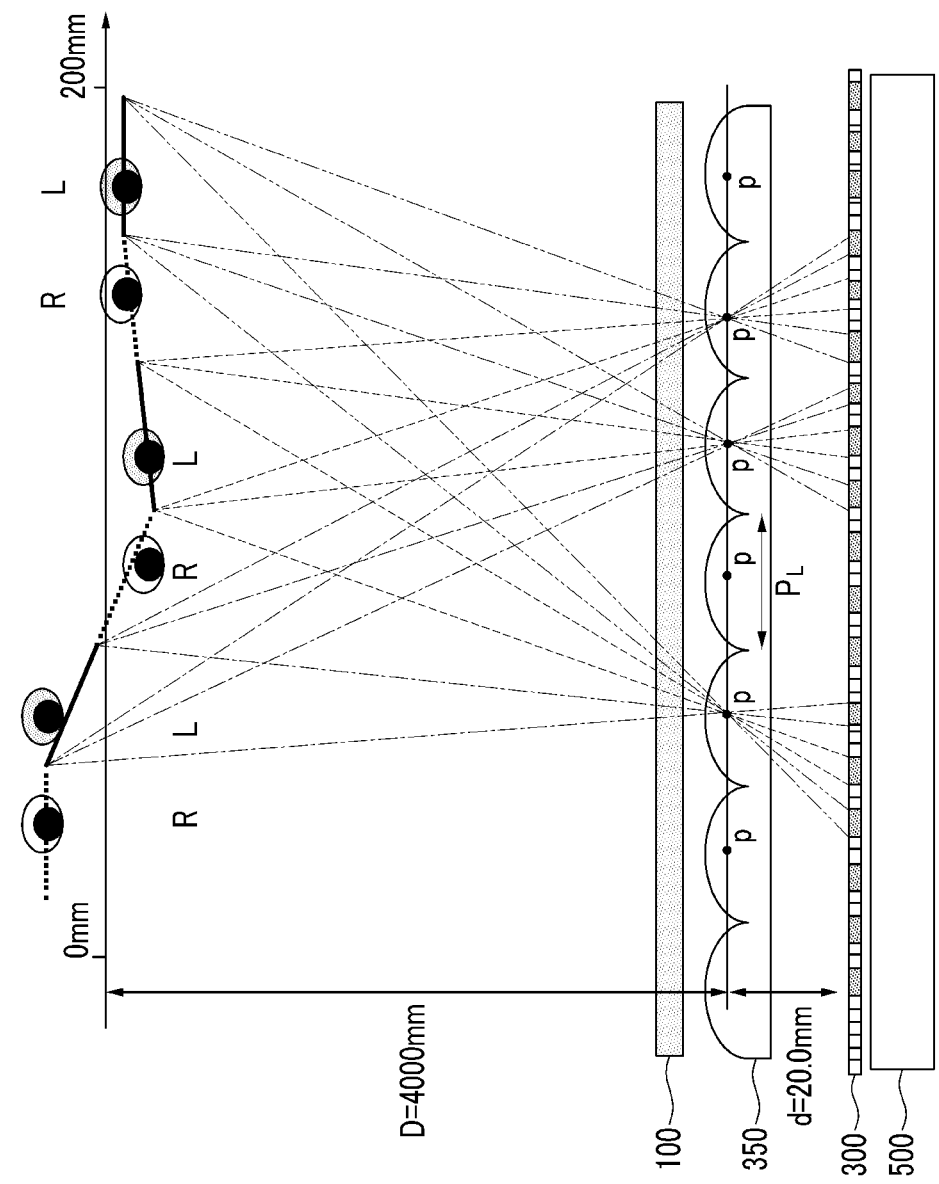
Figure 9:
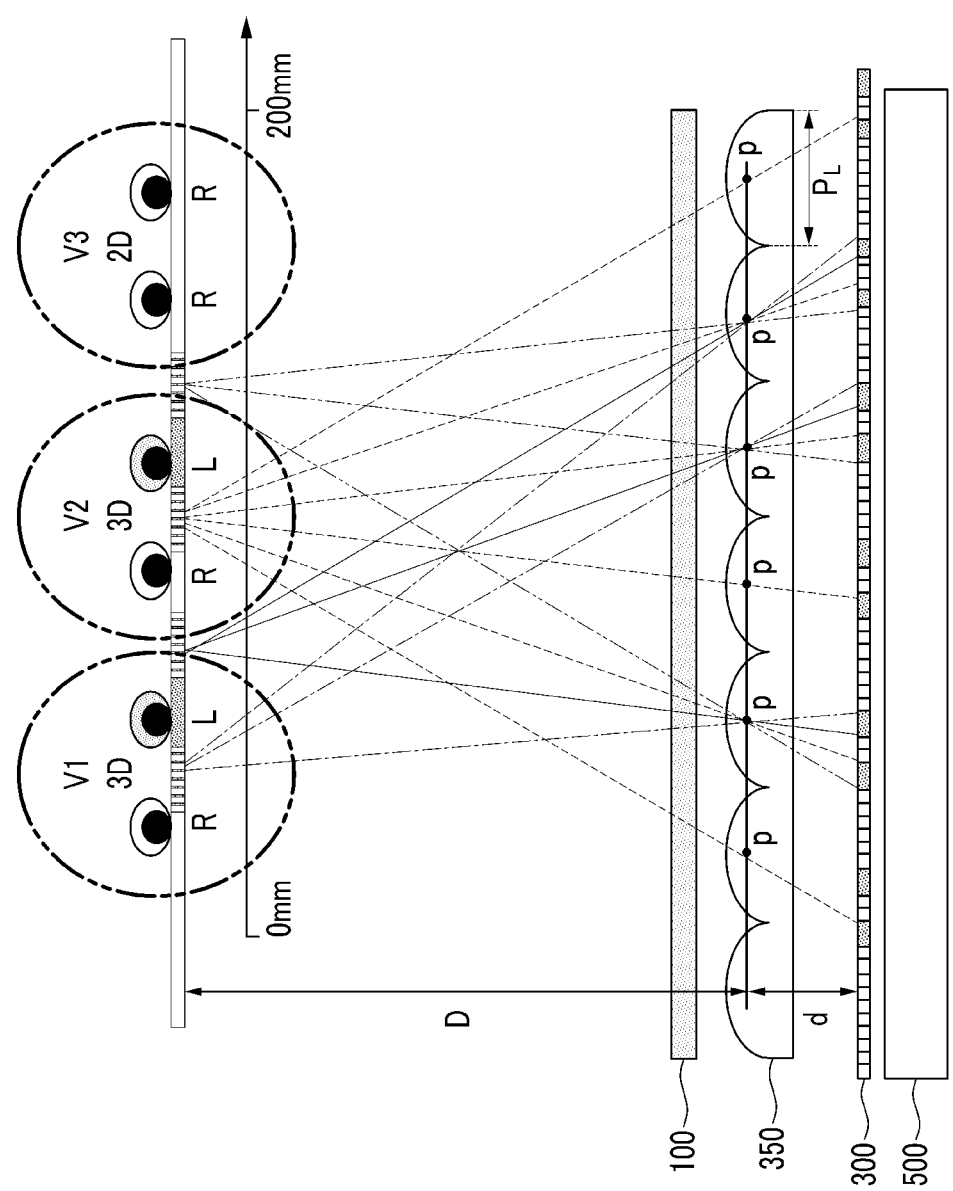

In an exemplary embodiment, the barriers of the barrier panel 300 includes a right-eye barrier, which is turned on when a right-eye image is displayed, and a left-eye barrier, which is turned on when a left-eye image is displayed, and the barriers is turned on at corresponding timings. In such an embodiment, the right-eye barrier applies the right-eye image where the light having passed a principal point of a lenticular lens is displayed on the liquid crystal panel 100 to the right eye of the viewer, and the left-eye barrier applies the left-eye image where the light having passed a principal point of the lenticular lens is displayed on the liquid crystal panel 100 to the left eye of the viewer. In such an embodiment, the right-eye barrier and the left-eye barrier are alternately turned on an off to provide different images to the eyes of the viewer and thus provide a 3-dimensional image. In an alternative exemplary embodiment, a barrier of the barriers may be included in both of the left-eye barrier and the right-eye barrier, that is, the left-eye barrier and in the right-eye barrier includes a same barrier. In an exemplary embodiment, which allows a plurality of viewers to watch a 3-dimensional image, as shown in FIGS. 7 to 9, the same barrier may be included both in the left-eye barrier and in the right-eye barrier.

Exemplary embodiments of the 3-dimensional image display device, and the predetermined condition for displaying a 3-dimensional image, which has mentioned above, will be described in greater detail with reference to FIGS. 2 to 4.

First, display of a 3-dimensional image at an optimum distance D will be described with reference to FIG. 2.

Figure 2:
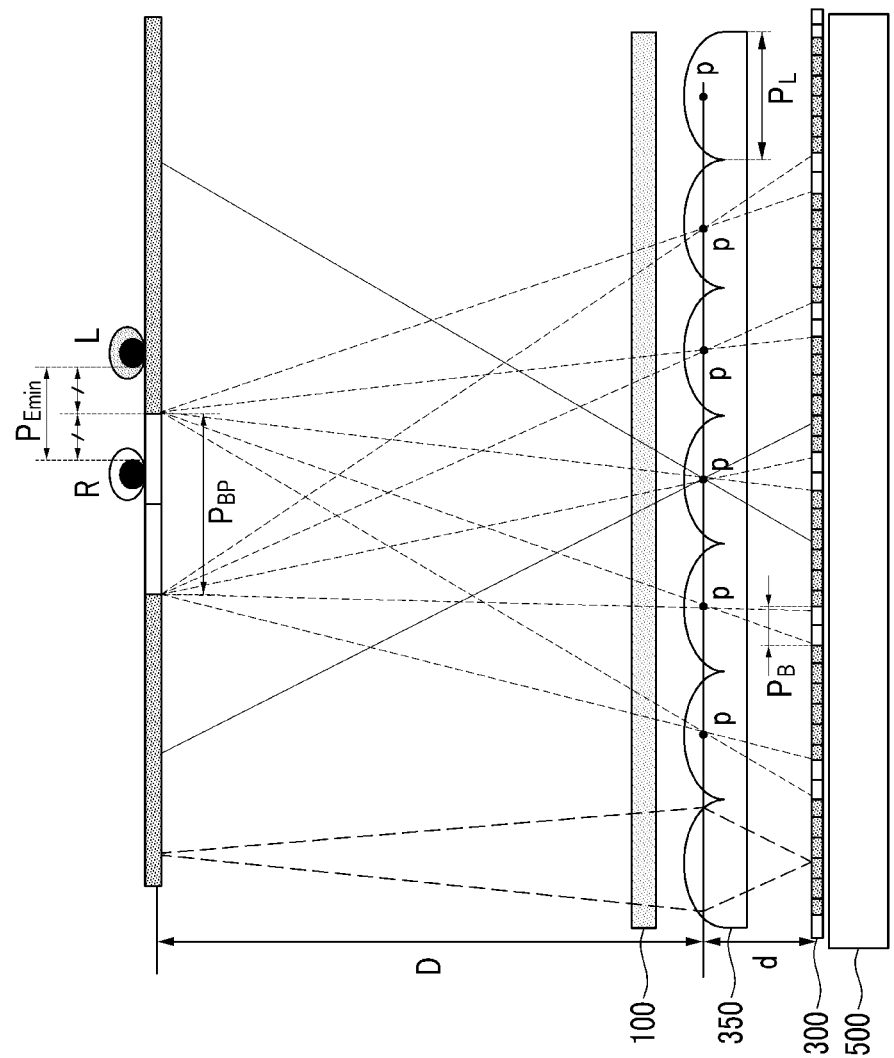
FIG. 2 is a schematic view illustrating paths of lights providing a 3-dimensional image to the eyes of a viewer positioned at an optimum distance from an exemplary embodiment of the 3-dimensional image display device according to the invention.

FIG. 2 is a schematic view illustrating paths of lights for providing a 3-dimensional image to the eyes of a viewer positioned at an optimum distance from an exemplary embodiment of the 3-dimensional image display device according to f the invention.

FIG. 2 schematically illustrates a section of an exemplary embodiment of the 3-dimensional image display device according to the invention.

The liquid crystal panel 100, the lenticular lens array 350 disposed below the liquid crystal panel 100, the barrier panel 300 disposed below the lenticular lens array 350, and the backlight unit 500 disposed below the barrier panel 300 are illustrated in FIG. 2.

The optical characteristics of the lenticular lenses of the lenticular lens array 350 may be described using principal points, which are denoted by p in the lenticular lenses in FIG. 2 and the like.

The distance from the principal points p of the lenticular lenses to the liquid crystal layer of the barrier panel 300 is denoted by d (hereinafter, referred to as a distance d between the barrier panel and the lenticular lenses), and an optimum distance from the principal points p of the lenticular lenses to the eyes of the viewer watching a 3-dimensional image is denoted by D (hereinafter, referred to as an optimum distance D).

The pitch of one lenticular lens is denoted by $P_L$ (hereinafter, also referred to as a pitch $P_L$ of a lenticular lens), and the pitch of one barrier is denoted by $P_B$ (hereinafter, also referred to as a barrier pitch $P_B$). The pitch projected corresponding to the barrier pitch $P_B$ at the optimum distance D is denoted by $P_{BP}$ (hereinafter, also referred to as a projection image pitch $P_{BP}$ at an optimum distance D). The left eye is denoted by L, the right eye is denoted by R, and $P_{Emin}$ denotes a minimum interval between the two eyes.

In an exemplary embodiment, the 3-dimensional image display device displays a 3-dimensional image at an optimum distance D, as shown in FIG. 2, which illustrates a relationship therebetween. FIG. 2 illustrates a right-eye image provided to the right eye R.

The light having transmitted through the barriers, which is turned on in the barrier panel 300, passes through the principal points p of the lenticular lenses to be provided to the viewer, and is focused at one point at an optimum distance D.

In an exemplary embodiment, the 3-dimensional image display device satisfies the following Equation 1.

$$d = 1/(1/f - 1/D) \qquad \text{[Equation 1]}$$

In Equation 1, d denotes a distance between the barrier panel and the lenticular lenses, D denotes an optimum distance, and f denotes a focal distance of the lenticular lenses.

In such an embodiment, the pitch $P_L$ of the lenticular lenses and the barrier pitch $P_B$ satisfy the following Equation 2.

$$P_B = P_L * (D+d)/D/m \qquad \text{[Equation 2]}$$

In Equation 2, m denotes a positive fraction.

In such an embodiment, m is a positive fraction value in Equation 2, such that the barrier pitch $P_B$ may not be limited to integer times or even-number times of the pitch $P_L$ of the lenticular lenses, but the relationship between the pitch $P_L$ of the lenticular lenses and the barrier pitch $P_B$ may be determined by various fraction values. Accordingly, the relationship between the pitches is substantially not limited.

The 3-dimensional image display device, in which the above-described relationship is satisfied, has the projection image pitch $P_{BP}$ at the optimum distance D to correspond to the size of the barriers that are turned on, and the projection image pitch $P_{BP}$ at the optimum distance D is expressed by the following Equation 3.

$$P_{BP} = P_B * D/d \qquad \text{[Equation 3]}$$

In Equation 3, if the projection image pitch $P_{BP}$ is determined, the barrier pitch $P_B$ may be determined. That is, the left-eye image is transferred only to the left eye to display a 3-dimensional image, and when the corresponding image is transferred to the right eye, crosstalk occurs, thereby deteriorating the quality of a 3-dimensional image. In an exemplary embodiment, where a viewer does not wear a pair of glasses, the barrier panel 300 is controlled to effectively prevent crosstalk.

In FIG. 2, a section where a right-eye image is displayed at an optimum distance D is denoted by $P_{BP}$. In an exemplary embodiment, when the left eye is positioned in the section, crosstalk may occur. In such an embodiment, the $P_{BP}$ section is thereby set to be smaller than a minimum value $P_{Emin}$ of the distance between the two eyes to effectively prevent crosstalk. In an exemplary embodiment, the following Inequation 1 is satisfied.

$$P_{Emin} > P_{BP} \qquad \text{[Inequation 1]}$$

The following Inequation 2 is obtained by arranging Inequation 1 with reference to the barrier pitch $P_B$ using Equation 3.

$$P_B < P_{Emin} * d/D \qquad \text{[Inequation 2]}$$

The minimum value $P_{Emin}$ of the distance between the two eyes employs a concept of a minimum value to satisfy the cases of various viewers, and when a viewer is specified, the distance between the two eyes of the viewer may be applied. Hereinafter, an exemplary embodiment, where 6.5 centimeters (cm) is applied as the minimum value $P_{Emin}$ of the distance between the two eyes, will be described for convenience of description, but the invention is not limited thereto.

In an exemplary embodiment, the barrier pitch $P_B$ is set as a value selected from the values satisfying the conditions of Equation 2 and Inequation 2, and then a 3-dimensional image is displayed.

In an exemplary embodiment, when the viewer is positioned at a distance greater than the optimum distance D, the barrier pitch $P_B$ is readjusted, which will be described with reference to FIGS. 3 and 4.

First, FIG. 3 will be described.

Figure 3:
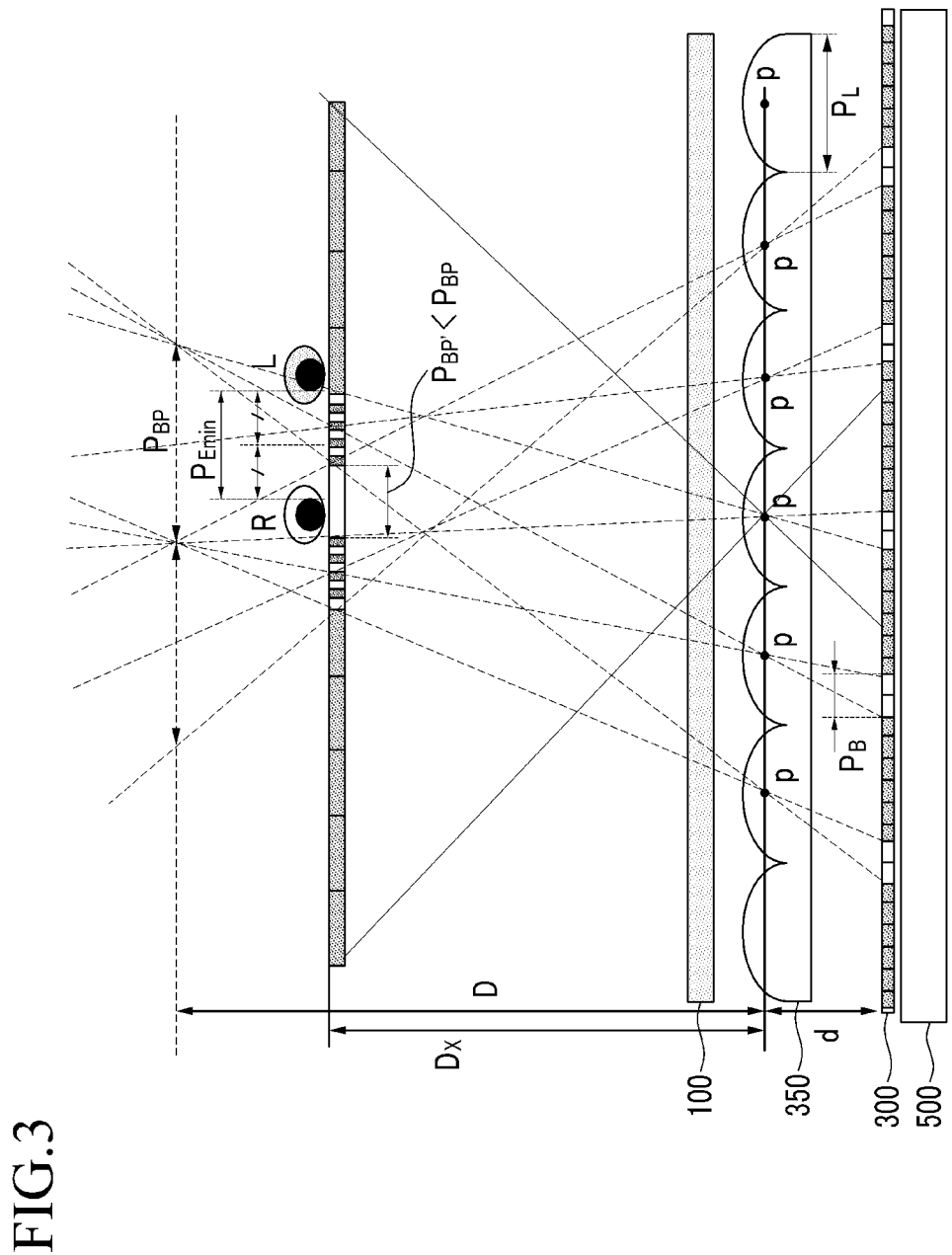
FIG. 3 is a schematic view illustrating paths of lights provided to the eyes of a viewer positioned at a distance closer than an optimum distance from an exemplary embodiment of the 3-dimensional image display device according to the invention.

FIG. 3 is a schematic view illustrating paths of lights provided to the eyes of a viewer positioned at a distance less than an optimum distance from an exemplary embodiment of the 3-dimensional image display device according to the invention.

FIG. 3 illustrates a viewer positioned at a distance less than an optimum distance D.

As shown in FIG. 3, when a distance (hereinafter, denoted by 'Dx') from the principal points p of the lenticular lenses to the viewer is less than the optimum distance D, a section $P_{BP'}$ where a right-eye image is viewed becomes narrower than a projection image pitch $P_{BP}$ at the optimum distance D due to the light interference based on the arrangement of the opened and closed barriers.

In such an embodiment, when the distance of the viewer becomes less than the optimum distance D, as shown in FIG. 3, the projection image pitch $P_{BP'}$ at the distance Dx of the viewer has a less value than the projection image pitch $P_{BP}$ at the optimum distance D shown in FIG. 2. In an exemplary embodiment, crosstalk is effectively prevented when a predetermined condition, e.g., Inequations 1 and 2, is satisfied. In an exemplary embodiment, as shown in FIG. 3, the predetermined condition, that is Inequations 1 and 2, is satisfied when the projection image pitch $P_{BP'}$ at the distance Dx of the viewer is smaller than the projection image pitch $P_{BP}$ at the optimum distance D.

In such an embodiment, when an image at the optimum distance D is continuously displayed, the right-eye image may not gather at one point near the eyes of the viewer as in FIG. 3, and thus a section where the right-eye image is viewed and a section where the right-eye image is not viewed may be in the form of a slit. As a result, a section $P_{BP'}$ where the right-eye image to be viewed may become narrower, thereby deteriorating the quality of a 3-dimensional image.

In an exemplary embodiment, the LUT 410 and the controller 400, the barrier pitch $P_B$ are controlled based on the following Inequations 3 and 4 through the eye tracking sensor 450 to display a 3-dimensional image such that the right-eye image is viewed near the eye of the viewer.

Inequations 3 and 4 are obtained by correcting Inequations 1 and 2 based on the distance of the viewer, which is less than the optimum distance D as shown in FIG. 3.

$$P_{Emin} > P_{BP'} \qquad \text{[Inequation 3]}$$

$$P_B < P_{Emin} * d/Dx \qquad \text{[Inequation 4]}$$

In such an embodiment, when the distance of the viewer is measured as Dx by the eye tracking sensor 450, one of the barrier pitches $P_B$ calculated by applying the corresponding values to Equation 2 and Inequation 4 is selected and the barrier is turned on based on the selected one of the barrier pitches $P_B$ corresponding to Dx.

Positions of the turned-on barrier in the barrier panel 300 is determined with reference to a barrier in a position where opposite ends of the projection image pitch $P_{BP}$ reversely progress to the principal points p of the lenticular lenses and meet the barrier panel 300 such that the projection image pitch $P_{BP}$ overlaps the right eye of the viewer at the distance Dx.

In an exemplary embodiment, a case in which the determined positions of the turned-on barrier may not coincide with a border between the unit barriers of the barrier panel 300 will be described later with reference to FIG. 10.

Figure 4:
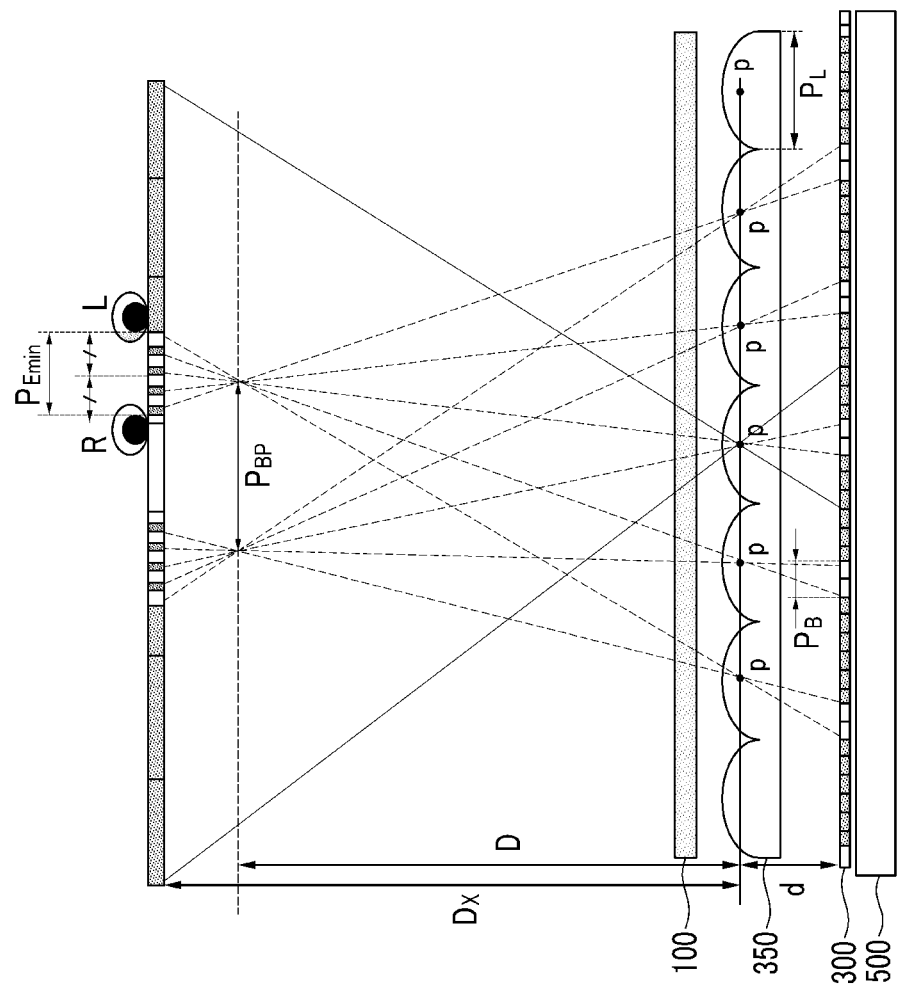
FIG. 4 is a schematic view illustrating paths of lights provided to the eyes of a viewer positioned at a distance more distant than an optimum distance from an exemplary embodiment of the 3-dimensional image display device according to the invention.

FIG. 4 illustrates that the distance of the viewer is greater than the optimum distance D, which will be described hereinafter.

FIG. 4 is a schematic view illustrating paths of lights provided to the eyes of a viewer which is positioned at a distance greater than an optimum distance from an exemplary embodiment of the 3-dimensional image display device according to the invention.

In an exemplary embodiment, when the distance Dx of the viewer from the principal points p of the lenticular lenses is greater than the optimum distance D, as shown in FIG. 4, the projection image pitch $P_{BP'}$ at the distance Dx of the viewer may have a value greater than the projection image pitch $P_{BP}$ at the optimum distance D shown in FIG. 2. In such an embodiment, the projection image pitch $P_{BP'}$ for a right-eye image may be greater than the interval between the two eyes, and crosstalk may thereby occur. Thus, when the viewer is positioned at a distance greater than the optimum distance D as in FIG. 4, the barriers are controlled based on the following Inequations 5 and 6, which are obtained by correcting Inequations 1 and 2 according to the distance Dx to the viewer.

$$P_{Emin} > P_{BP'} \qquad \text{[Inequation 5]}$$

$$P_B < P_{Emin} * d/Dx \qquad \text{[Inequation 6]}$$

Here, Inequation 6 is obtained by substituting Inequation 5 by Equation 3 and arranging the substituted Inequation 5 with reference to the barrier pitch $P_B$, and is substantially the same as Inequations 3 and 4.

Referring to In equation 6, when the distance of the viewer is measured as Dx by the eye tracking sensor 450, one of the barrier pitch $P_B$ values calculated by applying the corresponding values to Equation 2 and Inequation 6 is selected and the barrier corresponding to the selected one of the barrier pitch $P_B$ values is turned on to obtain the barrier pitch $P_B$ for providing a 3-dimensional image to the viewer at a distance greater than the optimum distance D.

The positions of the turned-on barrier is determined with reference to a barrier in a position where opposite ends of the projection image pitch $P_{BP}$ reversely progress to the principal points p of the lenticular lenses and meet the barrier panel 300 such that the projection image pitch $P_{BP}$ overlaps the right eye at the distance Dx of the viewer.

In an exemplary embodiment, a case in which the determined positions of the turned-on barrier may not coincide with a border between the unit barriers of the barrier panel 300 will be described later with reference to FIG. 10.

In an exemplary embodiment, as shown in FIGS. 3 and 4, a barrier pitch $P_B$ value is obtained based on a condition where a projection image pitch is less than a distance between the two eyes, and the barrier corresponding to the pitch is turned on to display a 3-dimensional image such that a right-eye image is not applied to the left eye of a viewer who is not located at an optimum distance. FIGS. 2 to 4 illustrate only the right-eye image has been described for convenience of description. Various modifications may be made in determining the positions of the barriers to be turned on and off based on the barrier pitch $P_B$ determined by the equations and the inequations described above. In such an embodiment, because the positions of the turned-on barrier are controlled with reference to a barrier in a position where opposite ends of the projection image pitch $P_{BP}$ reversely progress to the principal points p of the lenticular lenses and meet the barrier panel 300 such that the projection image pitch $P_{BP}$ overlaps only one eye at the distance Dx, but the positions of the projection image pitch $P_{BP}$ may vary.

Hereinafter, an exemplary embodiment of a method of determining the positions of the barrier pitch $P_B$ will be described in greater detail with reference to FIGS. 5 and 6. In such an embodiment, the positions of the barrier pitch $P_B$ may be controlled such that a border of the right-eye image and the left-eye image is located at a central portion of the two eyes to effectively prevent crosstalk.

Figure 5:
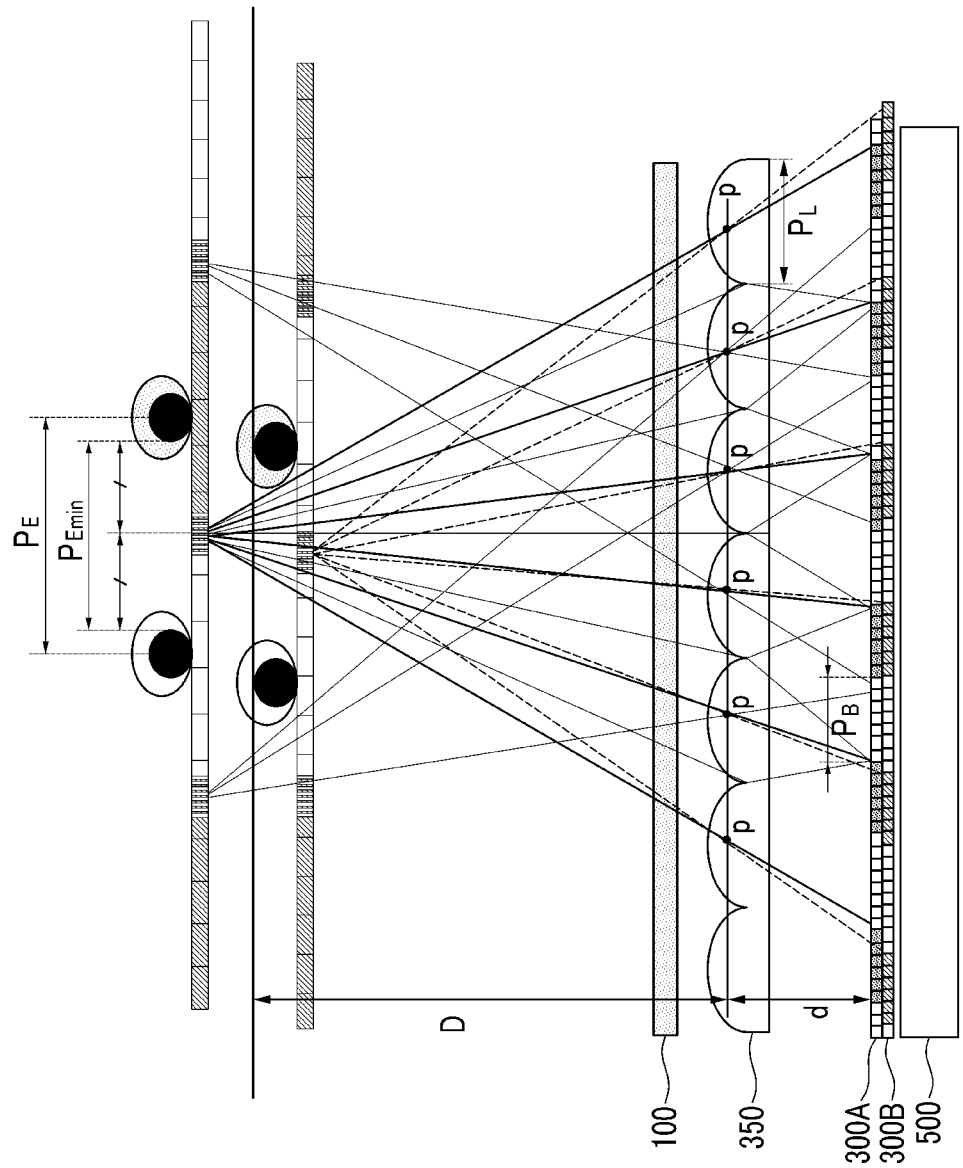
FIGS. 5 and 6 are schematic views illustrating an exemplary embodiment of a method for providing a 3-dimensional image without cross-talk to a viewer positioned at a distance greater or less than an optimum distance from a 3-dimensional image display device according to the invention.
Figure 6:
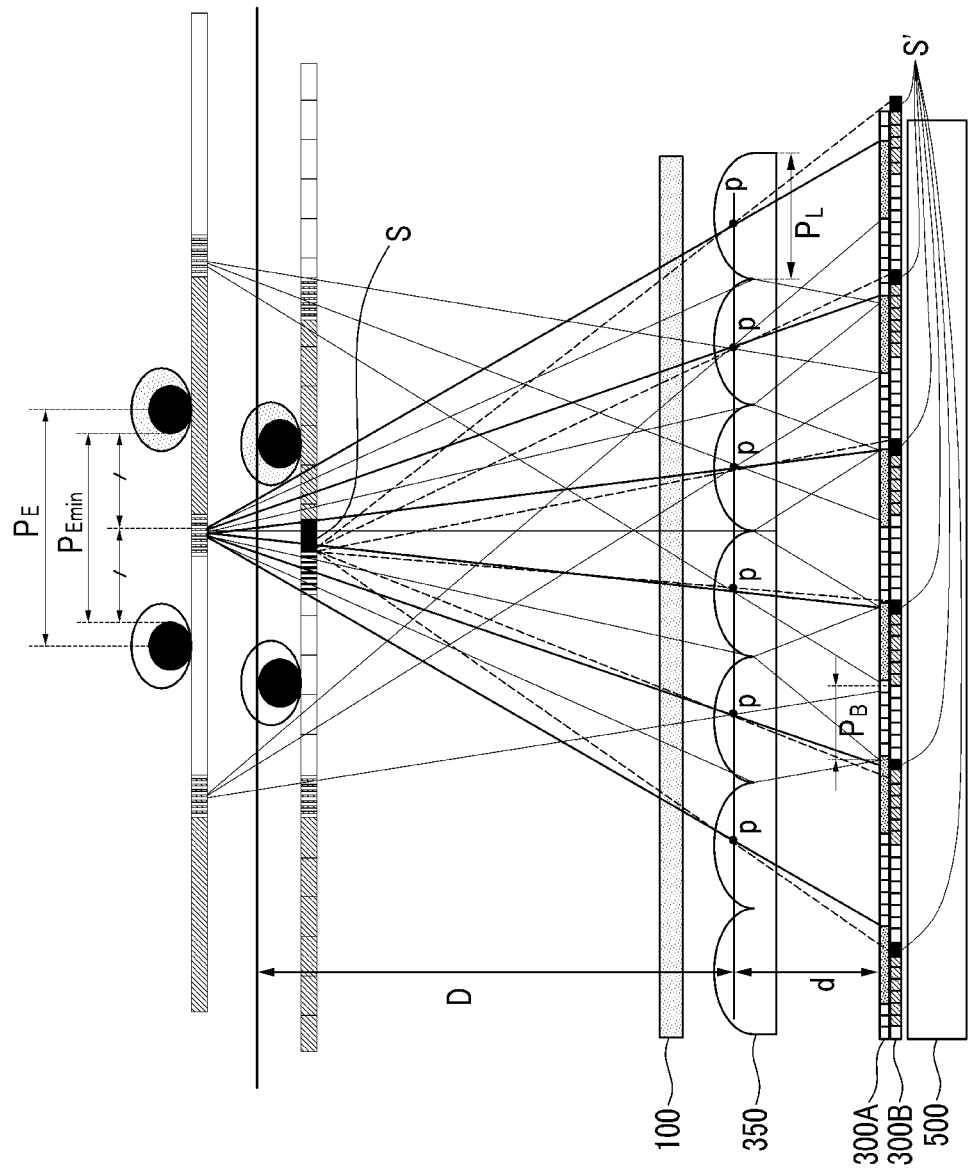

FIGS. 5 and 6 are schematic views illustrating an exemplary embodiment of a method for providing a 3-dimensional image without cross-talk to a viewer positioned at a distance greater or less than an optimum distance from the 3-dimensional image display device according to the invention.

First, FIG. 5 will be described.

The barriers may be divided into a barrier turned on to display a left-eye image (hereinafter, referred to as a left-eye barrier) and a barrier turned on to display a right-eye image (hereinafter, referred to as a right-eye barrier) with respect to a border of a unit barrier on a barrier panel which meets a line, which is an imaginary line, from the center of the two eyes to a principal point p of a lenticular lens, after the center of the two eyes of the viewer is detected by the eye tracking sensor 450.

In an exemplary embodiment, when an image is displayed by the left-eye barrier and the right-eye barrier, the barriers are further controlled such that a border between a left-eye image and a right-eye image is positioned at the center of the two eyes to effectively prevent crosstalk when an image is displayed.

In such an embodiment, the position where the line from the center of the two eyes through the principal points p of the lenticular lenses and the barrier panel meet each other may not coincide with the border between the unit barriers, and the barriers may be further controlled to adjust the positions to coincide with the border between the unit barriers, which will be described with reference to FIG. 10.

FIG. 5 illustrates a projection image where a right-eye image is displayed without hatching (referred to as a right-eye projection image), and illustrates a projection image where a left-eye image is displayed with hatching (referred to as a left-eye projection image). A region in the form of a slit pattern is in the intermediate region between the right-eye projection image and the left-eye projection image, and when the region is positioned within the optimum distance D, the border between the left-eye projection image and the right-eye projection image will form a line, but at a location beyond the optimum distance D, a section where the right-eye image and the left-eye image are mixed is formed in a slit pattern due to light interference. In such an embodiment, the quality of the 3-dimensional image is substantially improved when the section is positioned not overlapping the eyes.

FIG. 5 illustrates two barrier panels 300A and 300B having turned-on barriers in different positions corresponding to distances greater or less than the optimum distance D, respectively, but an exemplary embodiment of the 3-dimensional image display device does not include both of the two barrier panels 300A and 300B. Rather, both the two barriers panels 300A and 300B are illustrated in FIG. 5, for convenience of illustration, to show the position shift of the positions of the turned-on barriers. In FIG. 5, the barrier panel 300A shows turned-on barriers corresponds to a distance greater than the optimum distance D, and the barrier panel 300B shows turned-on barriers corresponds to a distance less than the optimum distance D.

As shown in FIG. 5, in an exemplary embodiment, the border between the right-eye image and the left-eye image is positioned at the center of the two eyes, and the position of the barrier pitch $P_B$ may be controlled to correspond to the positions of one border of the barrier pitch $P_B$ in the barrier panel 300. In such an embodiment, the size of the barrier pitch $P_B$ may be determined based on various methods of determining the barrier pitch $P_B$. According to an exemplary embodiment, a 3-dimensional image may be provided to the viewer by determining the size of the barrier pitch $P_B$ based on the value of the barrier pitch $P_B$ calculated using Equations 2 and Inequation 4 or using Equation 2 and Inequation 6 as describe above with reference to FIGS. 3 and 4.

In an exemplary embodiment, the barrier panel 300 may further include a barrier which is constantly turned off, which will be described with reference to FIG. 6.

FIG. 6 illustrates an exemplary embodiment where a barrier which is constantly turned off is positioned at a border between the left-eye barrier and the right-eye barrier to separate the left-eye image and the right-eye image.

FIG. 6 illustrates two barrier panels 300A and 300B having turned-on barriers in different positions corresponding to distances greater or less than the optimum distance D, respectively, but an exemplary embodiment of the 3-dimensional image display device does not include both of the two barrier panels 300A and 300B. Rather, both the two barriers panels 300A and 300B are illustrated in FIG. 6, for convenience of illustration, to show the position shift of the positions of the turned-on barriers. In FIG. 6, the barrier panel 300A shows turned-on barriers corresponds to a distance greater than the optimum distance D, and the barrier panel 300B shows turned-on barriers corresponds to a distance less than the optimum distance D.

A left-eye barrier and a right-eye barrier are divided with respect to a unit barriers on a barrier panel which meets a line from the center of the two eyes to a principal point p of a lenticular lens by constantly turning off the unit barrier, after the center of the two eyes of the viewer is detected by the eye tracking sensor 450. In FIG. 6, the left-eye barrier and the right-eye barrier are illustrated only in the barrier panel 300B corresponding to a distance less than the optimum distance D, for convenience of illustration. The barrier (hereinafter, referred to as a border barrier) which is constantly turned off is denoted by S' in FIG. 6.

A border, which is denoted by S in FIG. 6, is formed in the projection image due to the border barrier S'. In an exemplary embodiment, crosstalk in the left-eye image and the right-eye image is effectively prevented by the border S of the projection image. In such an embodiment, a light leakage phenomenon, by which light is leaked due to the border barrier, is substantially reduced, and crosstalk due to a lens aberration is substantially reduced or effectively prevented when the viewer is positioned at a distance greater than the optimum distance D.

FIG. 6 illustrates a projection image where a right-eye image is displayed without hatching (referred to as a right-eye projection image), and illustrates a projection image where a left-eye image is displayed with hatching (referred to as a left-eye projection image). A slit pattern is formed in the intermediate region between the right-eye projection image and the left-eye projection image. When the projection image is in the optimum distance D, the border between the left-eye projection image and the right-eye projection image may form a line, but when the projection image is at a distance less or greater than the optimum distance D, a section where the right-eye image and the left-eye image are mixed, thereby forming a slit pattern while lights interfere with each other. The border S of the projection image is denoted by a black color in FIG. 6.

In an exemplary embodiment, as shown in FIG. 6, the border between the right-eye image and the left-eye image, which is a border S of the projection images, is located at the center of the two eyes, and the positions of the barrier pitch $P_B$, e.g., the position of the border barrier S', may be determined with respect to the border barrier S'. In such an embodiment, the size of the barrier pitch $P_B$ may be controlled based on various methods of determining the barrier pitch $P_B$. According to an exemplary embodiment, a 3-dimensional image may be provided to the viewer by determining the size of the barrier pitch $P_B$ based on the value of the barrier pitch $P_B$ calculated using Equations 2 and Inequation 4 or using Equation 2 and Inequation 6 as describe above with reference to FIGS. 3 and 4.

As described above, in an exemplary embodiment, as shown in FIGS. 3 and 4, a 3-dimensional image is displayed by the projection image, the pitch of which is set to be less than the distance between the two eyes based on the distance of the viewer such that crosstalk is effectively prevented. In an exemplary embodiment, as shown in FIGS. 5 and 6, a 3-dimensional image is displayed by dividing the barriers into the left-eye barrier and the right-eye barrier such that the border of the left-eye image and the right-eye image is positioned corresponding to the center of the two eyes. In an exemplary embodiment, crosstalk may be substantially reduced or effectively prevented by controlling the pitch of the projection image and/or by dividing the barriers into the left-eye barrier and the right-eye barrier.

The size of the barrier pitch $P_B$ may be determined as described above with reference to FIGS. 3 and 4, and the position of the barrier pitch $P_B$ may be determined as described above with reference to FIGS. 5 and 6. However, exemplary embodiments of the invention are not limited thereto, but a projection image and a barrier are controlled using various methods to effectively prevent crosstalk.

Hereinafter, an exemplary embodiment of a method of displaying a 3-dimensional image to a plurality of viewers will be described with reference to FIGS. 7 to 9.

FIGS. 7 to 9 are schematic views illustrating exemplary embodiments of a method of providing a 3-dimensional image to a plurality of viewers using a 3-dimensional image display device according to the invention.

First, FIG. 7 illustrates that three viewers, e.g., a first viewer V1, a second viewer V2 and a third viewer V3, are positioned at an optimum distance D. As in the exemplary embodiment of FIG. 5, a border of a left-eye image and a right-eye image is positioned at the center of the two eyes.

In an exemplary embodiment, a left-eye barrier and a right-eye barrier are divided with respect to one border of the unit barrier on a barrier panel which meets a line from the center of the two eyes of each viewer to a principal point p of a lenticular lens, after the distances of the three viewers V1, V2 and V3 and the locations of the two eyes of each viewer are detected by the eye tracking sensor 450.

In an exemplary embodiment, when a left-eye barrier of one viewer overlaps a right-eye barrier of another viewer, the viewers may not recognize a 3-dimensional image. In such an embodiment, left-eye barriers and right-eye barriers of two viewers may be separated with respect to one border of the unit barrier on a barrier panel which meets a line from the center of the two adjacent eyes of another viewer to a principal point p of a lenticular lens. In such an embodiment, the number of barriers may be substantially increased such that the barriers are controlled with improved accuracy.

The pitch of the unit barrier may be estimated and applied based on an environment in which the 3-dimensional image display device is actually used, which will be described hereinafter.

In one exemplary embodiment, for example, when the optimum distance D is about 4000 millimeters (mm), the focal distance f (identical with d) of the lenticular lens is about 20 mm and the pitch $P_L$ of the lenticular lens is about 10 mm, the magnification becomes about 200 times. Thus, light can be controlled within a width range of about 2 meters (m) at the optimum distance. When the pitch $P_B$ of the barrier is calculated using Equation 3 based on the pitch of the projection image, which is about 6.5 cm as a typical distance between two eyes, the pitch $P_B$ of the barrier is about 0.32 mm. That is, 6.5 cm pitches may be formed in the projection image at an interval of about 0.3 mm, and the pitch of the barrier is substantially small in the unit of micrometers. Thus, the right-eye barriers and the left-eye barriers of the adjacent viewers of the plurality of viewers do not overlap each other. In one exemplary embodiment, for example, the pitch of the unit barrier is manufactured to have a size of about 50 micrometers (μm), and the unit of the pitch of the projection image may be about 0.00995 mm. In such an embodiment, even when the positions of the viewers overlap each other by a short distance, a 3-dimensional image may be provided as the viewers are substantially distinguished. Thus, the pitch of the barrier may have a unit of micro millimeter such that a 3-dimensional image is effectively displayed to a plurality of viewers.

In FIG. 7, an exemplary embodiment of a method of providing a 3-dimensional image to a plurality of viewers is shown using the exemplary embodiment of FIG. 5. In an alternative exemplary embodiment, an exemplary embodiment of a method of providing a 3-dimensional image to a plurality of viewers may be realized with a 3-dimensional display device in which a border barrier constantly turned off as in the exemplary embodiment of FIG. 6.

In an exemplary embodiment, when the viewers V1, V2 and V3 are positioned at different distances other than an optimum distance D, the barrier pitch $P_B$ in the unit of micrometer may provide a 3-dimensional image for each of the viewers. Such an embodiment will be described with reference to FIG. 8.

FIG. 8 illustrates when each of the plurality of viewers is positioned at locations other than an optimum distance D.

In an exemplary embodiment, a left-eye barrier and a right-eye barrier are determined with respect to a border of a unit barrier on a barrier panel which meets a line from the center of the two eyes of each viewer to a principal point p of a lenticular lens, after the distance Dx of the viewer is detected by the eye tracking sensor 450. In such an embodiment, a 3-dimensional image is displayed to the viewers by determining the sizes and positions of barrier pitches $P_B$ as described above with reference to FIGS. 3 to 6. In such an embodiment, left-eye barriers and right-eye barriers of two viewers may be divided by one border of the unit barrier on a barrier panel which meets a line from the center of the two adjacent eyes of adjacent viewers to a principal point p of a lenticular lens.

As described with reference to FIG. 7, a left-eye image and a right-eye image may be provided with a substantially narrow distance therebetween at a distance of the viewer based on the pitch of a unit barrier, which is substantially small, e.g., in a unit of micrometers, a 3-dimensional image is provided for viewers even when the viewers V1, V2 and V3 are present at different distances Dx other than an optimum distance D.

As shown in FIG. 8, an exemplary embodiment of a method of providing a 3-dimensional image to the viewers is described based on the exemplary embodiment of FIG. 5, but not being limited thereto. An exemplary embodiment of a method of providing a 3-dimensional image to the viewers may be realized using the exemplary embodiments of FIGS. 3, 4 and 6.

In an exemplary embodiment, when all the barrier panels are turned on in the 3-dimensional image display device, a 2-dimensional image is displayed. FIG. 9 illustrates an exemplary embodiment of a method for providing a 3-dimensional image to the first and second viewers V1 and V2 of the three viewers and providing a 2-dimensional image to the third viewer V3.

In an exemplary embodiment, as shown in FIG. 9, a left-eye barrier and a right-eye barrier are determined with respect to one border of the unit barrier on a barrier panel which meets a line from the center of the two eyes of two viewers to a principal point p of a lenticular lens, after the distances Dx of the first and second viewers V1 and V2 are detected by the eye tracking sensor 450.

In such an embodiment, when a right-eye image is displayed in an odd-numbered frame, the corresponding image is provided only to right eyes of the first and second viewers V1 and V2 and the corresponding image is provided to both the two eyes of the third viewer V3. Thereafter, when a left-eye image is displayed in an even-numbered frame, the corresponding image is provided only to left eyes of the first and second viewers V1 and V2 and the corresponding image is not applied to either of the two eyes of the third viewer V3 such that the third viewer V3 may recognize an image into which a black image is inserted. As a result, the two eyes of the third viewer V3 receive the same image to recognize a 2-dimensional image. In an exemplary embodiment, the 2-dimensional image may be properly recognized by interrupting one of the left and right images to prevent both of the left-eye image and the right-eye image, which are from each other, are provided to the third viewer V3.

In an exemplary embodiment, left-eye barriers and right-eye barriers of two viewers, e.g., the first and second viewers V1 and V2, may be determined with respect to one border of the unit barrier on a barrier panel which meets a line from the center of the two adjacent eyes of viewers V1 and V2 to a principal point p of a lenticular lens.

In an exemplary embodiment, the liquid crystal panel 100 may display the same image and all the barriers of the barrier panel are driven to be turned on to allow the viewers to receive the 2-dimensional image.

FIG. 9 illustrates that the viewers V1, V2 and V3 are positioned at an optimum distance D. When the viewers V1, V2 and V3 are positioned at locations other than the optimum distance, and when a 3-dimensional image is displayed to the first and second viewers V1 and V2 as in FIG. 7 or FIG. 8 and a 2-dimensional image is displayed to the third viewer V3, only one of the left-eye image and the right-eye image is provided to the third viewer V3 as in the case where the viewers are located at the optimum distance D.

The location where the line and the barrier panel meet each other may not coincide with the border between the unit barriers in FIGS. 7 to 9, and how to determine the discrepancy will be described with reference to FIG. 10. This is also the same in the cases of FIGS. 3 to 5.

Figure 10:
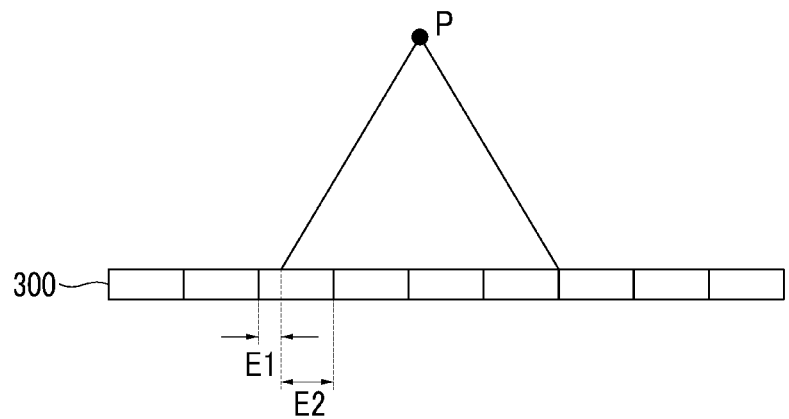
FIG. 10 is a schematic view illustrating an exemplary embodiment of a method of determining the left and right barriers in a barrier panel in the 3-dimensional image display device according to the invention.

FIG. 10 is a schematic view illustrating an exemplary embodiment of a method of determining the left and right barriers in a barrier panel in the 3-dimensional image display device according to the invention.

FIG. 10 schematically illustrates the principal location p of the lenticular lens with one point, and the unit barrier is distinguished by a line in the barrier panel 300.

Here, when the line passing through the principal point p of the lenticular lens meets the barrier panel, the line may coincide with the border of the unit barrier (see the right line of FIG. 10) but may be on an inner surface of the unit barrier. (See the left line of FIG. 10)

In an exemplary embodiment, the unit barrier meeting the left line in FIG. 10 may be the left barrier or the right barrier. In such an embodiment, after comparing the distances E1 and E2 between the points where the line meets both the borders, the closer border becomes a border of the barriers. In FIG. 10, the left-eye barrier and the right-eye barrier are determined with respect to the border on the side of E1.

In an exemplary embodiment, where the barrier panel includes the border barrier S' as in FIG. 6, the barrier meets the left line of FIG. 10 is determined as the border barrier S'. In an alternative exemplary embodiment, one of or both the two adjacent barriers may be selected as the border barrier S' when the two adjacent barriers meet the line as in the right line of FIG. 10. In another alternative exemplary embodiment, the barriers disposed adjacent to the barrier which meets the line may be included as the border barrier S'.

In an exemplary embodiment, the 3-dimensional image display device according to the exemplary embodiment of the invention may be applied to a portable display device such as a mobile phone or a gaming device as well as a large-scale display device such as a television ("TV"). An exemplary embodiment of the 3-dimensional image display device may be manufactured based on the different distances of the viewers of the portable and large-scale display devices.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A 3-dimensional image display device comprising:
   a backlight unit;
   a barrier panel disposed above the backlight unit and comprising a plurality of unit barriers which selectively blocks light passing therethrough;
   a lenticular lens array disposed above the barrier panel and comprising a plurality of lenticular lenses, wherein each of the lenticular lenses has a principal point;
   a liquid crystal panel disposed above the lenticular lens array and configured to display an image, the barrier panel disposed between the backlight unit and the liquid crystal panel;
   an eye tracking sensor which detects a position of eyes of a viewer and a distance between the principal point of the lenticular lenses and the eyes of the viewer; and
   a controller which controls the backlight unit, the barrier panel and the liquid crystal panel based on an output of the eye tracking sensor,
   wherein the controller turns on and off the unit barriers such that light emitted from the backlight unit and passed through the barrier panel passes through the principal point of the lenticular lenses to apply a right-eye image to a right eye of the viewer and apply a left-eye image to a left eye of the viewer.

2. The 3-dimensional image display device of claim 1, wherein
   a center of the two eyes of the viewer is detected by the eye tracking sensor, and
   the unit barriers are divided into a right-eye barrier and a left-eye barrier with respect to a unit barrier on the barrier panel which meets an imaginary line extending from the center of the two eyes to the principal point of the lenticular lenses.

3. The 3-dimensional image display device of claim 1, wherein
   a center of the two eyes of the viewer is detected by the eye tracking sensor,
   the unit barriers are divided into a right-eye barrier and a left-eye barrier with respect to a border of a unit barrier on the barrier panel,
   the unit barrier meets an imaginary line extending from the center of the two eyes through the principal point of the lenticular lenses, and
   a point at which the unit barrier and the imaginary line meet is closer to the border of the unit barrier than an opposing border of the unit barrier.

4. The 3-dimensional image display device of claim 2, wherein
   the unit barriers comprise a unit barrier which is disposed between the right-eye barrier and the left-eye barrier and constantly turned off.

5. The 3-dimensional image display device of claim 4, wherein
   a projection image pitch formed at a position of the eyes of the viewer is less than a distance between the eyes of the viewer.

6. The 3-dimensional image display device of claim 5, wherein
   when a barrier pitch is denoted as $P_B$, a pitch of the lenticular lenses is denoted as $P_L$, a minimum value of the distance between the two eyes of the viewer is denoted as $P_{Emin}$, a distance between the principal point of the lenticular lenses and the eyes of the viewer is denoted as Dx, and a distance between the barrier panel and the lenticular lenses is denoted as d, the following equation and inequation are satisfied:

$$P_B = P_L*(D+d)/D/m; \text{ and}$$

$$P_B < P_{Emin}*d/Dx,$$

wherein m is a positive fraction.

7. The 3-dimensional image display device of claim 2, wherein
   the liquid crystal panel comprises an upper polarizer, and
   the barrier panel comprises an upper polarizer and a lower polarizer.

8. The 3-dimensional image display device of claim 1, wherein:
   a projection image pitch formed at the position of the eyes of the viewer is less than a distance between the eyes of the viewer.

9. The 3-dimensional image display device of claim 8, wherein
   when a barrier pitch is denoted as $P_B$, a pitch of the lenticular lenses is denoted as $P_L$, a minimum value of the distance between the two eyes of the viewer is denoted as $P_{Emin}$, a distance between the principal point of the lenticular lenses and the eyes of the viewer is denoted as Dx, and a distance between the barrier panel and the lenticular lenses is denoted as d, the following equation and inequation are satisfied:

$$P_B = P_L*(D+d)/D/m; \text{ and}$$

$$P_B < P_{Emin}*d/Dx,$$

wherein m is a positive fraction.

10. The 3-dimensional image display device of claim 1, wherein
    when the number of viewers is greater than or equal to two and a first viewer and a second viewer of the viewers are adjacent to each other such that the right eye of the first viewer and the left eye of the second viewer is adjacent to each other, a center of the right eye of the first viewer and the left eye of the second viewer is detected by the eye tracking sensor,
    the unit barriers are divided into a right-eye barrier and a left-eye barrier of each of the first and second viewers, and
    the right-eye barrier of the first viewer and the left-eye barrier of a second viewer are separated with respect to a unit barrier positioned at a point where an imaginary line extending from the center of the right eye of the first viewer and the left eye of the second viewer through the principal point of the lenticular lenses meet the barrier panel.

11. The 3-dimensional image display device of claim 10, wherein
    only one of the right-eye image and the left-eye image is provided to a viewer of the plurality of viewers such that the viewer receives a 2-dimensional image.

12. A display method of a 3-dimensional image display device comprising a liquid crystal panel, a barrier panel behind the liquid crystal panel, a lenticular lens array between the liquid crystal panel and the barrier panel, a backlight unit behind the barrier panel, an eye tracking sensor and a controller, the method comprising:
    detecting a position of a left eye and right eye of a viewer and a distance between the left and right eyes of the viewer using the eye tracking sensor;

operating unit barriers of the barrier panel as a right-eye barrier and a left-eye barrier by the controller based on an output of the eye tracking sensor;

turning on the right-eye barrier when the a right-eye image is displayed by the liquid crystal panel such that the right-eye image is applied to the right eye of the viewer by light emitted from the backlight unit and passed through the barrier panel passing through principal points of lenticular lenses in the lenticular lens array; and turning on the left-eye barrier when the a left-eye image is displayed by the liquid crystal panel to apply the left-eye image to a left eye of the viewer by light emitted from the backlight unit and passed through the barrier panel passing through the principal points of the lenticular lenses in the lenticular lens array.

13. The display method of claim 12, wherein the operating the unit barriers of the barrier panel as the right-eye barrier and the left-eye barrier comprises:

dividing the unit barriers into the right-eye barrier and the left-eye barrier with respect to a unit barrier of the barrier panel which meets an imaginary line extending from the center of the left and right eyes through a principal point of a lenticular lens in the lenticular lens array.

14. The display method of claim 12, wherein the operating the unit barriers of the barrier panel as the right-eye barrier and the left-eye barrier comprises:

dividing the unit barriers into the right-eye barrier and the left-eye barrier with respect to a border of a unit barrier on the barrier panel, wherein the unit barrier meets an imaginary line extending from the center of the two eyes through the principal point of the lenticular lenses, and wherein a point at which the unit barrier and the imaginary line meet is closer to the border of the unit barrier than an opposing border of the unit barrier.

15. The display method of claim 13, further comprising constantly turning on a unit barrier disposed between the right-eye barrier and the left-eye barrier.

16. The display method of claim 12, wherein a projection image pitch formed at the position of the left and right eyes of the viewer is less than a distance between the left and right eyes of the viewer.

17. The display method of claim 16, wherein when a barrier pitch is denoted as $P_B$, a pitch of the lenticular lens is denoted as $P_L$, a minimum value of the distance between the two eyes of the viewer is denoted as $P_{Emin}$, a distance between the principal point of the lenticular lenses and the eyes of the viewer is denoted as Dx, and a distance between the barrier panel and the lenticular lenses is denoted as d, the following equation and inequation are satisfied:

$P_B = P_L*(D+d)/D/m$; and $P_B < P_{Emin}*d/Dx$, wherein m is a positive fraction.

18. The display method of claim 12, wherein when the number of viewers is greater than or equal to two and a first viewer and a second viewer of the viewers are adjacent to each other such that the right eye of the first viewer and the left eye of the second viewer is adjacent to each other, a center of the right eye of the first viewer and the left eye of the second viewer is detected by the eye tracking sensor, and the unit barriers of the barrier panel are divided into a right-eye barrier and a left-eye barrier of each of the first and second.

19. The display method of claim 18, wherein the right-eye barrier of the first viewer and the left-eye barrier of a second viewer are separated with respect to a unit barrier positioned at a point where an imaginary line extending from the center of the right eye of the first viewer and the left eye of the second viewer through the principal point of the lenticular lenses meet the barrier panel.

20. The display method of claim 18, wherein only one of the right-eye image and the left-eye image is provided to a viewer of the plurality of viewers such that the viewer receives a 2-dimensional image.

* * * * *